United States Patent Office 3,498,848
Patented Mar. 3, 1970

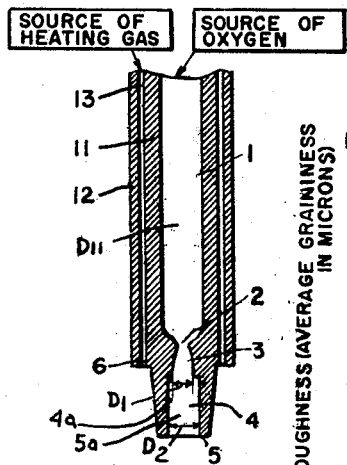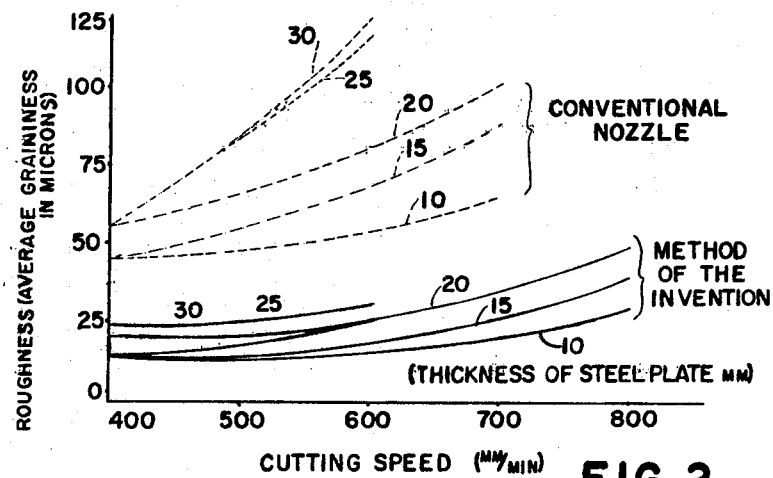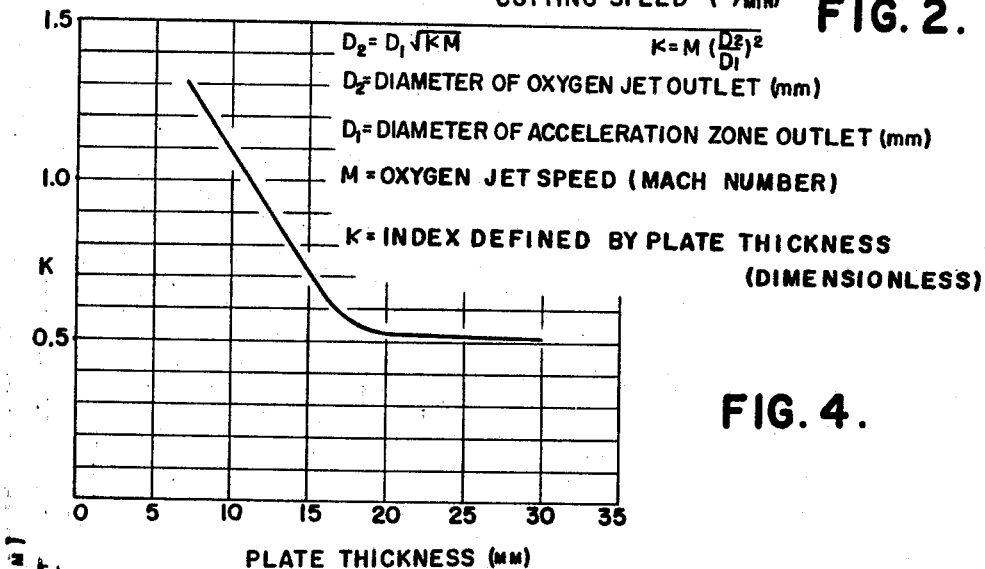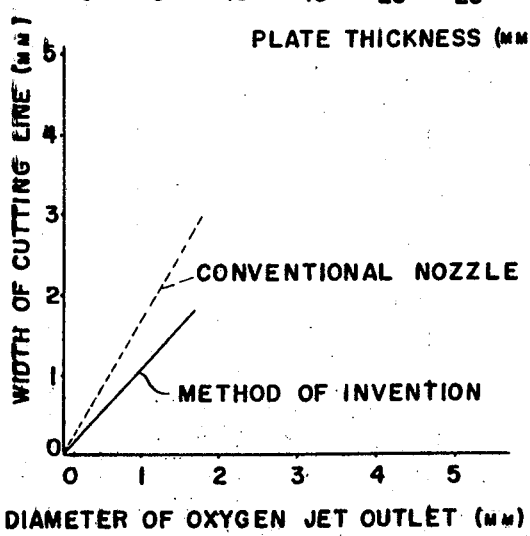

3,498,848
METHOD AND APPARATUS FOR HIGH-SPEED CUTTING WITH OXYGEN
Yoshimasa Kidowaki, Matsubara, Japan, assignor to Iwstani and Company Limited, Japan
Filed May 6, 1966, Ser. No. 548,252
Int. Cl. B23k 7/00
U.S. Cl. 148—9                            6 Claims

ABSTRACT OF THE DISCLOSURE

A method of high speed precision cutting with a workpiece with oxygen comprising the steps of: imparting to oxygen a flow substantially at the speed of sound in a sonic zone; of accelerating the speed of oxygen emanating from said sonic zone to a first supersonic speed in an acceleration zone; of dividing the supersonic flow of oxygen emanating from the acceleration zone into two jet segments of oxygen flow, one being an inner cylindrically shaped jet of a second supersonic flow and the other being an outer jet of subsonic flow, said outer jet cylindrically surrounding said inner jet of oxygen, and of heating said workpiece with a cylindrical envelope of a flame surrounding the two jets at the point of impact with said workpiece.

An apparatus for high speed precision cutting with oxygen comprising a pressurized source of oxygen; a nozzle having a sonic speed oxygen chamber and means to conduit oxygen from said source of oxygen to said chamber at sonic pressure; a constriction at the outlet orifice of said sonic chamber and an acceleration zone means of said oxygen past said constriction for accelerating the flow of said oxygen into a first supersonic flow; a widened double sonic zone past said acceleration zone of two flows of oxygen, said widened zone having an abruptly overall diameter greater than that of the terminal orifice of said acceleration zone; said double sonic zone forming an inner second supersonic zone of flow of oxygen and an adjacent subsonic flow zone of flow of oxygen, surrounding said second supersonic zone; a cutting orifice terminating said double sonic zone; a heating gas source and conduit and means to direct said heating gas under pressure in flame to surround the outflowing two flows of oxygen at said cutting orifice.

BACKGROUND OF THE INVENTION

Field of the invention

This invention relates to improvements in a method for high-speed precision cutting of steel and, more particularly, to a close-to-work cutting method involving the use of an oxygen blowpipe nozzle of the divergent type incorporating certain improvements.

DESCRIPTION OF THE PRIOR ART

It is known that whereas a straight blowpipe nozzle delivers an oxygen jet at a subsonic velocity, a divergent nozzle is capable of delivering a supersonic jet of oxygen and, hence, makes it possible to execute cutting at a considerably higher speed, at the expense, however, of lowering the quality of a cut obtained as well as hereinafter described in detail with reference to one of the advantageous features of the invention.

Conventional blowpipe nozzles are used at some substantial distances from work, i.e. from about 5 mm. to about 20 mm., irrespective of whether the nozzles are of the straight type or of the divergent type. This is done not only to prevent the white cone of the heating gas from contacting work but also to avoid the objectionable phenomenon of the molten slag adhering to the nozzle thereby blocking the oxygen jet, obstructing the heating gas orifices and, accordingly, blowing out the flame, or causing a backfire.

However, when the nozzle is held at a substantial distance, as is conventionally practiced, the oxygen jet expands under the influence of the heating flame, whereby the oxygen jet in the boundary zone adjoining the heating flame is disturbed and impinges at a slant on the surface of workpiece.

This slant oxygen flow causes the molten slag flow over the surface of the workpiece, thereby creating a rounded edge or an eaves-like formation of slag along the edge of the cut. Furthermore, with the conventional nozzles, the width of the cutting line generally ranges from 1.4 to 1.5 times the diameter of the oxygen jet outlet.

SUMMARY OF THE INVENTION

This invention is concerned with a highly efficient method of cutting steel, characterized in that the blowpipe nozzle is held in close proximity with the workpiece. Such a close-to-work disposition of the nozzle normally is considered inpracticable, if not impossible.

To attain the close-to-work operation briefly described above without incurring the disadvantages hitherto encountered, this invention utilizes a divergent nozzle comprising an oxygen jet passageway bored or otherwise formed within the nozzle body and a suitable number of heating gas orifices formed, in the case of a concentric arrangement, to which I do by no means limit the present invention, about said oxygen jet passageway and, also, within said nozzle body, said oxygen jet passageway being constricted downwardly to form a bottleneck, the lower end of which flares into an acceleration zone, which is further downwardly formed into a cylindrical configuration, which, in case cutting of metal sheets of small thickness is desired, is specifically enlarged laterally as is illustrated and will hereinafter be described in detail.

The above-mentioned cylindrical portion located downwardly of said acceleration zone projects downward from the level at which said heating gas orifices discharge so that when the nozzle is held in close proximity with work in actual operation, the said orifices discharge at a suitable distance from work.

This invention has as one of its objects to provide a method for high-speed precision cutting of metal by means of a blowpipe nozzle of the improved design and construction. Another object is to provide a method for high-speed precision cutting of metal of small thicknesses.

Other objects and advantages of the invention will become apparent as the following description proceeds, reference being had to the accompanying drawings, in which:

FIG. 1 is a longitudinal section view of the lower half of a concentric blowpipe nozzle which is used to demonstrate the close-to-work high-speed precision cutting method of the invention;

FIG. 2 is a diagrammatic representation of the relationship between cutting speed and the roughness of cut;

FIG. 3 is a diagrammatic representation of the relative efficiencies of the conventional blowpipe nozzle and the nozzle embodying the principles of the invention, in which the diameter of the oxygen jet outlet is plotted against the width of cutting line; and FIG. 4 is a diagram showing the relationship between the thickness of work and $k$ factor which is related to the thickness of an annular subsonic jet zone to be provided in the oxygen passageway of the nozzle to attain a given neatness of cut. Referring, now, to FIG. 1, the cutting oxygen gas 7 kg./cm.$^2$ or up, introduced into a sonic zone 1 flows through a bottleneck 2 into an acceleration zone 3, in which the oxygen flows at a supersonic speed, i.e. 2M to 3.5M. The resulting jet is further guided downwardly through a double jet zone extension 4 of said acceleration zone 3, said extension projecting beyond the level at which heating gas orifices 6 discharge. It will be obvious that in this arrangement, the oxygen jet thrusts perpendicularly downwards and impinges on the surface of work at right angles, for in cutting operations, the nozzle tip is held in close proximity with work, i.e. about 1 to 3 millimeters. The oxygen jet travels only so small distances before contacting work that it is less affected by the heating flame, while the heating flame delivered from the orifices 6 is kept sufficiently away from work to prevent the extremity of its white cone reaching the surface of work.

The above arrangement is advantageous in that, as briefly stated hereinbefore, the eaves-like accumulation of slag along the upper edge of cut or the rounding of the upper edge of cut is prevented, that the width of cutting line is small and substantially equal to the diameter of oxygen jet outlet 5, i.e. the diameter of said extension 4, that a neat cut surface is obtained, and that a higher cutting speed is attained becauses of the divergent construction of the oxygen passageway.

To attain a neater cut in a workpiece of small thicknesses, the divergent blowpipe nozzle described above may further incorporate certain improved structural concepts. Thus, in the nozzle described hereinbefore, the extension 4 of said acceleration zone 3 is laterally enlarged to provide an annular subsonic jet zone 4a. In this arrangement, the oxygen jet is diverged in two jets, one being a supersonic jet in zone 5a and the other being the subsonic jet 4a surrounding the supersonic jet in an annular form.

The thickness of said subsonic jet is modified according to the thickness of work. Thus, as diagrammatically shown in FIG. 4, when the thickness of work is sufficiently large, the thickness of the subsonic jet should be small, or may be non-existent. However, when small thicknesses are to be cut, the subsonic jet should have some great thicknesses.

FIG. 4 shows the relationship between those two factors. The thickness of said subsonic jet which is suited to the thickness of work may be attained by altering the ratio of the diameter $D_2$ of zone 4 to the diameter $D_1$ of zone 3 (see FIG. 1).

The heating gas orifices 6 discharge at a distance of about 2 mm. to 20 mm. from the level of the oxygen jet outlet 5. The nozzle in accordance with FIGURE 4 is formed of two coaxial cylinders, an outer 12 and an inner 11, of different diameters forming between them an intermediate chamber 13 for the heating gas. It will be apparent that in this arrangement, when the nozzle tip is held close to work at a distance of about 1 to 3 mm. in actual cutting operation, the extremity of the white cone of the heating flame cannot reach the surface of work even if a large amount of gas is burned.

The blowpipe nozzle to be employed in the method of this invention tends to be heated more intensely than conventional nozzles, for it is more exposed to the heating flame. To prevent the entire blowpipe nozzle from being overheated, it must be constructed of a material which has an adequate coefficient of thermal conductivity.

The extension 4 of said acceleration zone 3, in particular, is preferably made of heat resisting material such as ceramics. In many experiments which I conducted according to the high-speed cutting method of this invention, the oxygen from outlet 5 was utilized in the oxidation of steel plate and, also, in the removal of the resulting molten slag so efficiently that neither rounded edges nor eaves-like accumulations of slag were observed and that the cut had an inordinately neat appearance.

The roughness of cut obtained according to this invention is far less pronounced as diagrammatically illustrated in FIG. 2. Thus, the cut is about one-third as rough as the cut executed with the conventional nozzle in the case of steel plates from 10 to 15 millimeters thick, and about one-third to one-fourth as rough in the case of steel plates from 20 to 30 millimeters in thickness. From the results of a cutting test carried out by various cutting methods, it has been found that, when a steel plate about 20 millimeters thick are cut, whereas the conventional nozzle must be moved at a speed of about 400 mm. per min. to yield an average graininess (roughness) of 50 microns, the present invention attains the same roughness value of 50 microns at the cutting speed of about 800 mm. per min.

Furthermore, as diagrammatically shown in FIG. 3, the present method yields a considerably reduced width of cutting line which is substantially identical with the diameter of the oxygen jet outlet.

It will be apparent from the foregoing description that the high-speed precision cutting method of this invention has a remarkable advantage over the conventional techniques.

What I claim as my invention:

1. A method of high-speed precision cutting a workpiece with oxygen comprising the steps of: imparting to oxygen a flow substantially at the speed of sound in a sonic zone; accelerating the speed of oxygen emanating from said sonic zone to a first supersonic speed in an acceleration zone; dividing the supersonic flow of oxygen emanating from the acceleration zone into two jet segments of oxygen flow, one being an inner cylindrically shaped jet of a second supersonic flow and the other being an outer jet of subsonic flow, said outer jet cylindrically surrounding said inner jet of oxygen, and heating said workpiece with a cylindrical envelope of a flame surrounding the two jets at the point of impact with said workpiece.

2. A method as claimed in claim 1, said second supersonic speed being greater than said first supersonic speed.

3. A method as claimed in claim 1, said second supersonic speed being in the range from 2M to 3.5M.

4. A method as claimed in claim 1, said gas in the sonic zone being subjected to a pressure from about 7 kg./cm.$^2$ up.

5. A method as claimed in claim 1, further comprising the step of directing the two jet segments perpendicularly toward the workpiece to be cut.

6. A method as claimed in claim 1, further comprising the step of directing the said two jet segments toward the workpiece to be cut from a distance of about 1 to 3 mm.

References Cited

UNITED STATES PATENTS 2,521,199   9/1950   Babcock _____ 148—9

L. DEWAYNE RUTLEDGE, Primary Examiner

W. W. STALLARD, Assistant Examiner

U.S. Cl. X.R.

266—23